United States Patent [19]
Reynolds

[11] Patent Number: 5,390,563
[45] Date of Patent: Feb. 21, 1995

[54] COMPOUND TRANSMISSION HAVING SPLITTER TYPE AUXILIARY SECTION

[75] Inventor: Joseph D. Reynolds, Climax, Mich.

[73] Assignee: Eaton Corporation, Cleveland, Ohio

[21] Appl. No.: 61,921

[22] Filed: May 14, 1993

[51] Int. Cl.⁶ .................... F16D 11/04; F16H 3/08
[52] U.S. Cl. ......................... 74/339; 74/333; 74/355
[58] Field of Search ............. 74/333, 355, 356, 339, 74/377, 376, 373; 192/67 R, 48.91

[56] References Cited

U.S. PATENT DOCUMENTS

| | | |
|---|---|---|
| 2,637,221 | 5/1953 | Backus . |
| 2,637,222 | 5/1953 | Backus . |
| 2,753,729 | 7/1956 | Main ........................ 74/377 |
| 2,887,199 | 5/1959 | Funk ........................ 74/377 |
| 3,105,395 | 10/1963 | Perkins . |
| 3,110,382 | 11/1963 | Jones ........................ 74/339 |
| 3,283,613 | 11/1966 | Perkins . |
| 3,648,546 | 3/1972 | McNamara et al. . |
| 3,799,002 | 3/1974 | Richards . |
| 3,921,469 | 11/1975 | Richards . |
| 3,924,484 | 10/1975 | Richards . |
| 3,983,979 | 10/1976 | Richards . |
| 4,290,515 | 9/1981 | Bogema et al. . |
| 4,440,037 | 4/1984 | Foxton et al. . |
| 4,515,031 | 5/1985 | Janson ........................ 74/376 |
| 4,527,447 | 7/1985 | Richards . |
| 4,754,665 | 7/1988 | Vandervoort ........................ 74/745 |
| 5,267,636 | 12/1993 | Fielding ........................ 74/339 |

FOREIGN PATENT DOCUMENTS

| | | | |
|---|---|---|---|
| 1630948 | 8/1971 | Germany ........................ 74/339 |
| 2138258 | 2/1973 | Germany ........................ 74/339 |
| 452231 | 10/1949 | Italy ........................ 74/373 |

*Primary Examiner*—John T. Kwon
*Assistant Examiner*—Michael S. Lee
*Attorney, Agent, or Firm*—Brooks & Kushman

[57] ABSTRACT

A compound transmission comprising a main section and an auxiliary section is disclosed. The auxiliary section includes includes an auxiliary drive gear, an output shaft, and at least one auxiliary countershaft. The auxiliary drive gear is rotatably mounted on a mainshaft, and the output shaft has a splitter gear rotationally fixed thereto. An annular strut is fixed to the input shaft, while an auxiliary section clutch is mounted to a distal end of the strut beyond the root diameters of the auxiliary drive gear and the splitter gear. The auxiliary section clutch is movable between a first position wherein rotation of the mainshaft is transmitted to the auxiliary drive gear and a second position wherein rotation of the mainshaft is transmitted to the splitter gear.

16 Claims, 3 Drawing Sheets

COMPOUND TRANSMISSION HAVING SPLITTER TYPE AUXILIARY SECTION

TECHNICAL FIELD

This invention relates to compound transmissions including a multispeed main transmission section connected in series with a multispeed auxiliary transmission section, and in particular to such a compound transmission having an auxiliary section with a single splitter gear.

BACKGROUND ART

Compound change gear transmissions of the type having one or more auxiliary sections connected in series with a main transmission section are known in the prior art. Auxiliary transmission sections are of three general types: range, splitter, or combined range/splitter.

Examples of compound transmissions having range type auxiliary sections may be seen by reference to U.S. Pat. No. 3,105,395; U.S. Pat. No. 2,637,222; and U.S. Pat. No. 2,637,221, the disclosures of which are hereby incorporated by reference. Examples of compound change gear transmissions having splitter type auxiliary sections may be seen by reference to U.S. Pat. No. 4,290,515; U.S. Pat. No. 3,799,002; U.S. Pat. No. 4,440,037; and U.S. Pat. No. 4,527,447, the disclosures of which are hereby incorporated by reference. Examples of a compound transmission having a single combined range/splitter type auxiliary section may be seen by reference to U.S. Pat. No. 3,283,613 and U.S. Pat. No. 3,648,546, the disclosures of which are hereby incorporated by reference.

Blocked change gear transmissions of both the single and the compound types are also well known in the prior art as may be seen by reference to U.S. Pat. No. 3,799,002; U.S. Pat. No. 3,921,469; U.S. Pat. No. 3,924,484; U.S. Pat. No. 3,983,979; U.S. Pat. No. 4,192,196; and U.S. Pat. No. 4,194,410, all of which are hereby incorporated by reference.

It should be noted that the terms main and auxiliary section are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

SUMMARY OF THE INVENTION

The present invention is a compound transmission comprising a main section and an auxiliary section. The auxiliary section includes an auxiliary drive gear, an output shaft, and at least one auxiliary countershaft. The auxiliary drive gear is rotatably mounted on a mainshaft, and the output shaft has a splitter gear rotationally fixed thereto. Each auxiliary countershaft has first and second auxiliary countershaft gears rotatable with the auxiliary countershaft and rotatably engaged with the auxiliary drive gear and the splitter gear, respectively. An annular strut is fixed to the mainshaft, while an auxiliary section clutch is mounted to a distal end of the strut beyond the root diameters of the auxiliary drive gear and the splitter gear. The auxiliary section clutch is movable between a first position wherein rotation of the mainshaft is transmitted to the auxiliary drive gear and a second position wherein rotation of the mainshaft is transmitted to the output shaft.

Accordingly, it is an object of the present invention to provide a new and improved compound transmission having a two-speed auxiliary transmission section including a single splitter gear.

This and other objects and advantages of the present invention will become apparent from a reading of the detailed description of the preferred embodiment taken in connection with the drawings.

DESCRIPTION OF THE PREFERRED EMBODIMENT

Figure 1:
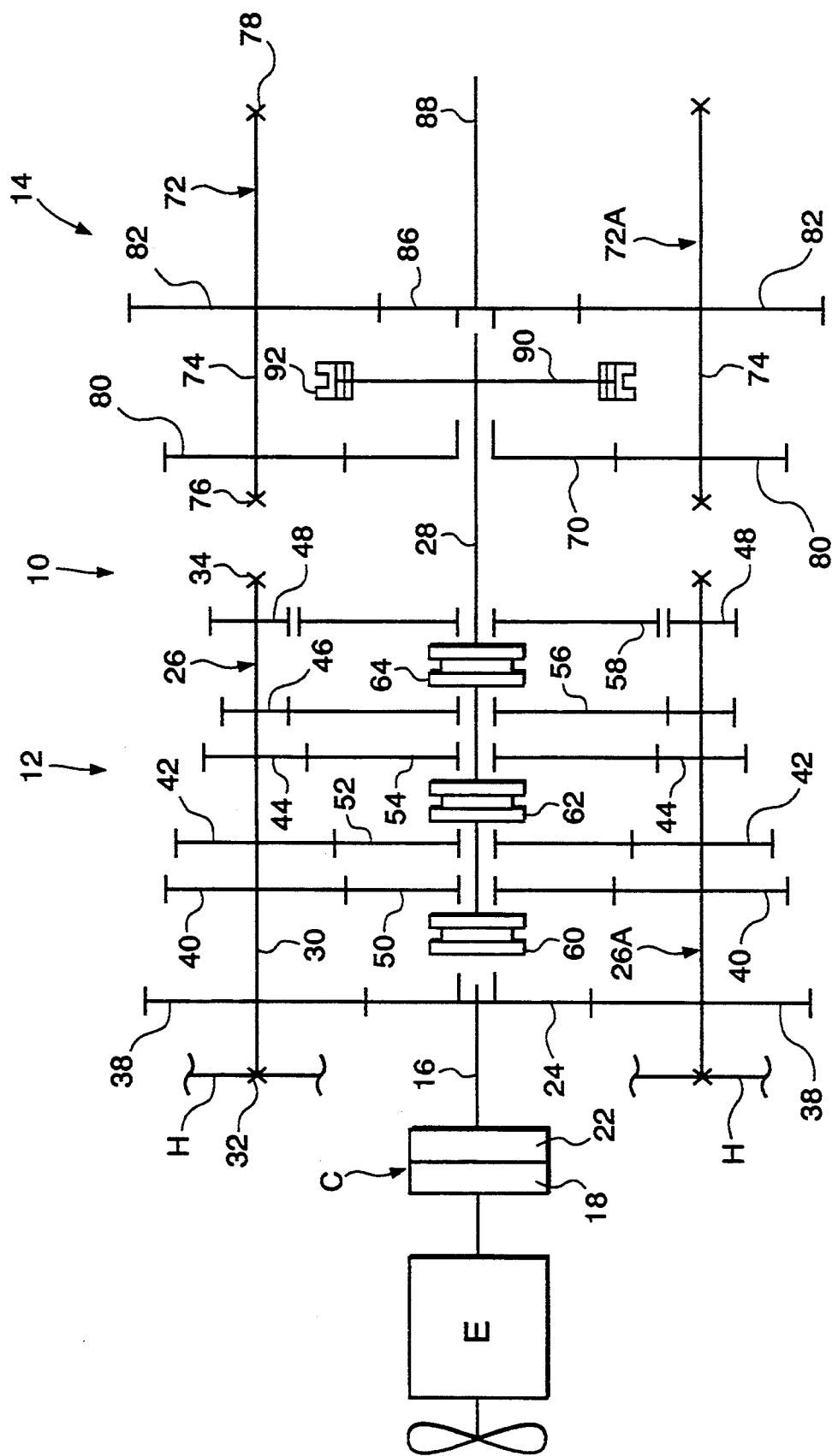
FIG. 1 is a schematic illustration of a compound transmission having a splitter type auxiliary section according to the present invention.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer respectively to the front and rear ends of the transmission as conventionally mounted in a vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section.

FIG. 1 shows a ten speed "5×2" compound transmission 10 according to the present invention. Compound transmission 10 comprises a multiple speed main transmission section 12 connected in series with an auxiliary transmission section 14. Typically, transmission 10 is housed within a single housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 rotationally fixed thereto for simultaneously driving a plurality of countershaft assemblies at substantially identical rotational speeds. In the transmission 10 illustrated, two substantially identical main section countershaft assemblies 26 and 26A are provided on opposite sides of mainshaft 28, which is generally coaxially aligned with the input shaft 16. Each of the main section countershaft assemblies 26 and 26A comprises a main section countershaft 30 supported by bearings 32 and 34 in housing H, only a portion of which is schematically illustrated. Each of the main section countershafts 30 is provided with an identical grouping of main section countershaft gears 38, 40, 42, 44, 46 and 48 fixed for rotation therewith.

A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group, which mounting means and special advantages resulting therefrom are explained in greater detail in U.S. Pat. No. 3,105,395 and U.S. Pat. No. 3,335,616, the disclosures of which are hereby incorporated by reference.

Typically, clutch collars 60, 62 and 64 are axially positioned by means of shift yokes or forks associated with a shift bar housing assembly, for example as described in U.S. Pat. No. 4,901,600, assigned to the assignee of the present invention and hereby incorporated by reference. Clutch collars 60, 62 and 64 are, in the preferred embodiment, of the well known nonsynchronized double acting jaw clutch type. Jaw clutches 60, 62, and 64 are three-position clutches in that they may be positioned in a centered axially nondisplaced, nonengaged position as illustrated, or in a fully rightwardly engaged or fully leftwardly engaged position by means of the shift levers. As is well known, only one of the clutches 60, 62 and 64 is engageable at a given time and main section interlock means are provided to lock the other clutches in the neutral condition.

Although the present invention is illustrated as a multiple identical countershaft, floating mainshaft and floating mainshaft gear type, and while the auxiliary transmission section of the present invention is particularly well suited for such transmission structure, the advantages of the present invention are equally applicable to transmission of the single countershaft or non-identical multiple countershaft type.

Main transmission section 12 provides five selectable forward speed ratios. The first and lowest forward speed ratio is provided by drivingly connecting mainshaft drive gear 56 to mainshaft 28. The other four forward ratios, in descending order of reduction ratio provided, are obtained by drivingly connecting mainshaft gears 54, 52, 50 or 24 to the mainshaft 28. Main section mainshaft gear 58 is the reverse gear and is in continuous meshing engagement with countershaft gears 48 by means of conventional intermediate idler gears (not shown).

Auxiliary transmission section 14 is connected in series with main transmission section 12. Mainshaft 28 extends into the auxiliary section 14 and has an auxiliary drive gear 70 rotatably mounted thereon. The auxiliary drive gear 70 may be clutched to the mainshaft, as described below, to constantly and simultaneously drives two substantially identical auxiliary section countershaft assemblies 72 and 72A at equal rotational speeds. Each of the auxiliary countershaft assemblies 72 and 72A comprises an auxiliary countershaft 74 supported by bearings 76 and 78 in housing H.

Figure 2:
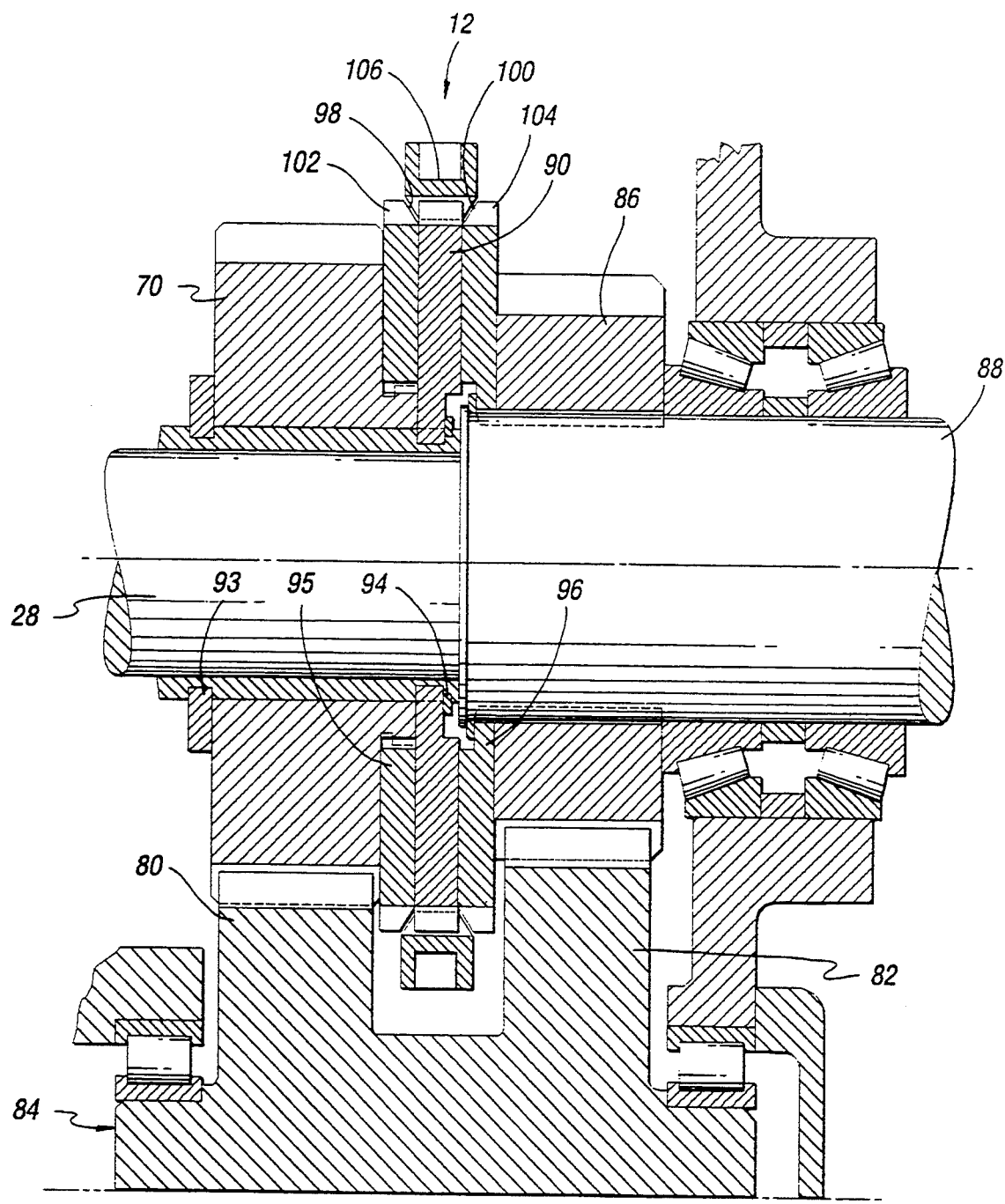
FIG. 2 is a partial sectional view of a main transmission section of the compound transmission of FIG. 1.

As shown in FIG. 2, each auxiliary countershaft has countershaft gears 80 and 82 rotatable therewith, preferably in the form of an integral compound gear 84. The auxiliary section countershaft gears 80 are constantly meshed with and support auxiliary section auxiliary drive gear 70. Auxiliary section countershaft gears 82 are constantly meshed with and support a splitter gear 86 which is rotationally fixed to an output shaft 88 generally coaxial with the mainshaft 28.

A generally annular extension member or strut 90 has an inner diameter or periphery rotationally fixed to the mainshaft 28, and a distal second end or outside diameter to which is mounted with splines a nonsynchronized, dog tooth auxiliary section clutch 92. The auxiliary section clutch 92 is mounted to the outside diameter of the strut 90 beyond a root or minor diameter of the auxiliary drive gear 70, and preferably beyond an outside diameter of the auxiliary drive gear. Similarly, the clutch 92 is mounted to the strut 90 beyond a root diameter of the splitter gear 86, and preferably beyond an outside diameter of the splitter gear. The auxiliary drive gear 70 and the extension member 90 are axially retained relative to the mainshaft 28 by means of retaining washer 93 and snap ring 94 disposed around the circumference of the mainshaft.

On opposite sides of strut 90 are situated first and second intermediate members 95 and 96, respectively. The first intermediate member 95 is disposed between the strut 90 and the auxiliary drive gear 70, and is splined on a hub of the auxiliary drive gear for rotation therewith. The second intermediate member 96 is disposed between the strut 90 and the splitter gear 86, and is rotationally fixed to the output shaft 88 and rotatable with the splitter gear.

The clutch collar 92 is provided with clutch teeth 98 and 100 for selective axial engagement with conical clutching teeth 102 and 104 respectively provided on intermediate members 95 and 96. The clutch collar 92 is also provided with a groove 106 for receipt of a shift fork (not shown). The sliding two position jaw clutch collar 92 is movable by the shift fork between an axially leftwardmost first position and an axially rightwardmost second position. In the first position, auxiliary section clutch 92 engages the teeth 102 of the first intermediate member 95 to transmit rotation of the mainshaft 28 thereto and to the auxiliary drive gear 70. In the second position, the auxiliary section clutch 92 engages the teeth 104 of the second intermediate member 96 to transmit rotation of the mainshaft 28 thereto, and to the splitter gear 86 and the output shaft 88. Typically, the shift fork is controlled by a remotely controlled fluid actuated piston assembly. The piston assembly is operable by a driver selection switch such as a button or the like on the shift knob, for example as described in U.S. Pat. No. 5,000,060.

Clutch teeth 98 and 102 present opposed tapered surfaces which are inclined at about 35 degrees relative to the axis of the mainshaft 28, which provides an advantageous interaction tending to resist nonsynchronous engagement and also tending to cause a synchronous rotation as is described in greater detail in U.S. Pat. No. 3,265,173, the disclosure of which is hereby incorporated by reference. Clutch teeth 100 and 104 are provided with similar complementary tapered surfaces.

Figure 3:
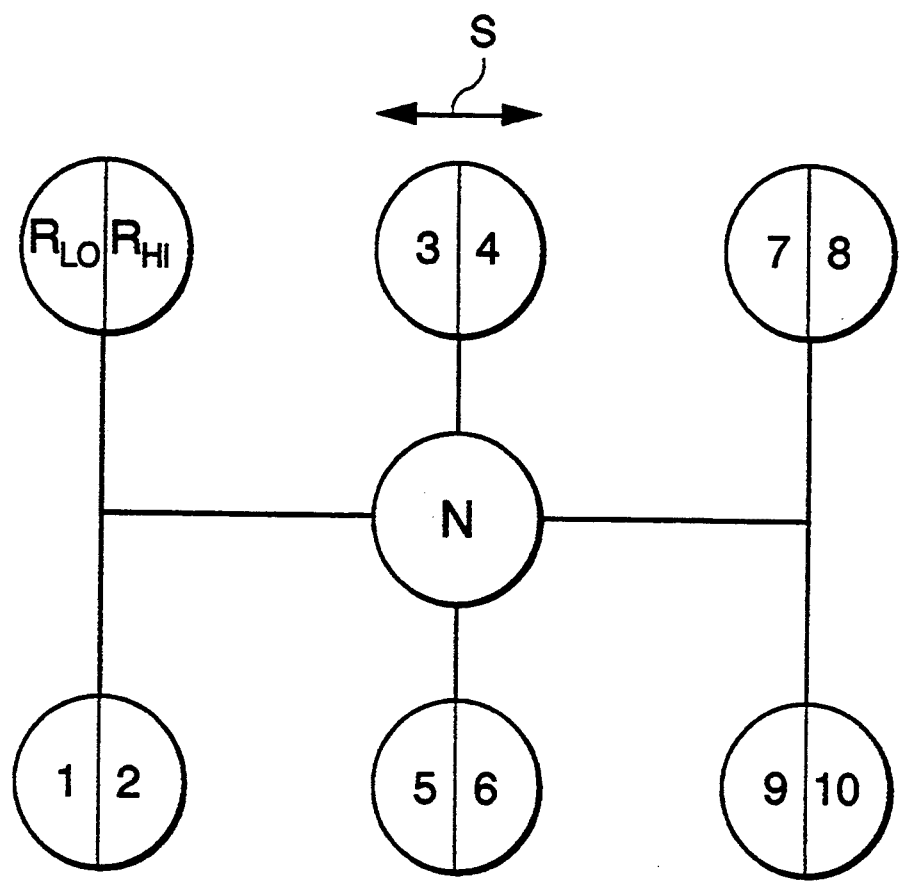
FIG. 3 is a schematic illustration of a shift pattern for the compound transmission.

FIG. 3 shows the shift pattern for shifting the ten speed compound transmission 10. Divisions in the horizontal direction illustrated by the arrow S represent splitter shifts. All of the six shift pattern positions provide two selectable ratios, including the reverse gear position. In the leftwardmore shift pattern positions, the clutch collar 92 is in its rightwardmost axial position, and the auxiliary section 14 preferably provides a direct drive from the mainshaft 28 through the strut 90 and the second intermediate member 96 to the output shaft 88. In the rightwardmore shift pattern positions, the clutch collar 92 is in its leftwardmost axial position, and the power path provided is from the mainshaft 28 through the strut 90, the first intermediate member 95 to the auxiliary drive gear 70, then through the countershafts and out through the splitter gear 86 to the output shaft 88.

The present invention thus provides a compound transmission including an auxiliary section with a splitter clutch having teeth at a large radial distance from the input and output shafts. This results in greater circumferential velocity of the teeth of the non-synchronized splitter clutch, which decreases the window for engagement with the associated gear. This structure improves the splitter shift quality, and diminishes the problem of backlash or shift shock which commonly occurs in prior art designs, particularly at higher rotational speeds. Furthermore, the axial force required to disengage the splitter clutch during splitter shifts from either of the members 95 or 96 is proportionally reduced as the radius at which the splitter clutch is located is increased.

Although the present invention has been set forth with a certain degree of particularity, it is understood that various modifications are possible without departing from the spirit and the scope of the invention as hereinafter claimed.

What is claimed is:

1. A compound transmission comprising a main section connected in series with an auxiliary section, the auxiliary section including:
   an input shaft having an auxiliary drive gear rotatably mounted thereon;
   an output shaft having a splitter gear rotationally fixed thereto;
   at least one auxiliary countershaft having first and second auxiliary countershaft gears rotatable with the auxiliary countershaft and rotatably engaged with the auxiliary drive gear and the splitter gear, respectively;
   a strut having a first end rotationally fixed to the input shaft and a distal second end; and
   a dog tooth clutch mounted to the second end of the strut beyond a root diameter of the splitter gear, the clutch being movable between a first position wherein rotation of the input shaft is transmitted to the auxiliary drive gear and a second position wherein rotation of the input shaft is transmitted to the splitter gear.

2. The compound transmission of claim 1 wherein the clutch is non-synchronized.

3. The compound transmission of claim 1 wherein the clutch is mounted to the strut beyond a root diameter of the auxiliary drive gear.

4. The compound transmission of claim 1 wherein the clutch is mounted to the strut beyond an outside diameter of the splitter gear.

5. The compound transmission of claim 1 wherein the clutch is mounted to the strut beyond an outside diameter of the auxiliary drive gear.

6. The compound transmission of claim 1 further comprising a first intermediate member disposed between the strut and the auxiliary drive gear and rotatable with the auxiliary drive gear, the clutch engaging the first intermediate member in the first position to transmit rotation of the input shaft thereto.

7. The compound transmission of claim 1 further comprising a second intermediate member disposed between the strut and the splitter gear and rotatable with the splitter gear, the clutch engaging the second intermediate member in the second position to transmit rotation of the input shaft thereto.

8. The compound transmission of claim 1 wherein the first and second auxiliary countershaft gears are integral.

9. The compound transmission of claim 1 wherein the strut is generally annular and has an inner periphery fixed to the input shaft.

10. The compound transmission of claim 1 wherein the main section includes:
    an input shaft having an input gear rotationally fixed thereto;
    a mainshaft having a plurality of forward gears and a reverse gear rotatably mounted thereon;
    at least one countershaft drivable by the input gear, the countershaft having a plurality of countershaft gears rotatable with the countershaft and rotatably engaged with a corresponding mainshaft gear; and
    a plurality of clutches rotatable with the mainshaft and adapted to clutch the mainshaft gears to the mainshaft.

11. The compound transmission of claim 10 wherein the main transmission section provides five forward speed ratios.

12. The compound transmission of claim 10 wherein the auxiliary section input shaft is driven by the mainshaft of the main section.

13. The compound transmission of claim 10 wherein the auxiliary section input shaft comprises the mainshaft of the main section.

14. The compound transmission of claim 13 wherein the mainshaft is generally coaxial with the auxiliary section output shaft.

15. The compound transmission of claim 1 wherein the splitter gear is coupled to the output shaft to provide direct drive between the input shaft and the output shaft.

16. A compound transmission comprising:
    a main section including:
       an input shaft having an input gear rotationally fixed thereto,
       a mainshaft having a plurality of forward gears and a reverse gear rotatably mounted thereon,
       at least one countershaft drivable by the input gear, the countershaft having a plurality of countershaft gears rotatable with the countershaft and rotatably engaged with a corresponding mainshaft gear, and a plurality of clutches rotatable with the mainshaft and adapted to clutch the mainshaft gears to the mainshaft; and an auxiliary section including:
- an auxiliary drive gear rotatably mounted on the mainshaft,
- an output shaft having a splitter gear rotationally fixed thereto,
- at least one auxiliary countershaft having first and second auxiliary countershaft gears rotatable with the auxiliary countershaft and rotatably engaged with the auxiliary drive gear and the splitter gear, respectively,
- a generally annular strut having an inner diameter rotationally fixed to the mainshaft and an outside diameter,
- a non-synchronized auxiliary section dog tooth clutch mounted to the outside diameter of the extension member beyond an outside diameter of the auxiliary drive gear and beyond an outside diameter of the splitter gear, the auxiliary section clutch being movable between a first position wherein rotation of the mainshaft is transmitted to the auxiliary drive gear and a second position wherein rotation of the mainshaft is transmitted to the splitter gear,
- a first intermediate member disposed between the strut and the auxiliary drive gear and rotatable with the auxiliary drive gear, the auxiliary section clutch engaging the first intermediate member in the first position to transmit rotation of the mainshaft thereto, and
- a second intermediate member disposed between the strut and the splitter gear and rotatable with the splitter gear, the auxiliary section clutch engaging the second intermediate member in the second position to transmit rotation of the mainshaft thereto.

* * * * *